(12) United States Patent
Veil et al.

(10) Patent No.: US 9,407,086 B2
(45) Date of Patent: Aug. 2, 2016

(54) SAFETY SWITCHING DEVICE WITH POWER SUPPLY

(71) Applicant: Pilz GmbH & Co. KG, Ostfildern (DE)

(72) Inventors: Richard Veil, Ostfildern (DE); Udo Mueller, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 146 days.

(21) Appl. No.: 14/465,048

(22) Filed: Aug. 21, 2014

(65) Prior Publication Data

US 2014/0362480 A1    Dec. 11, 2014

Related U.S. Application Data

(63) Continuation of application No. PCT/EP2013/052952, filed on Feb. 14, 2013.

(30) Foreign Application Priority Data

Feb. 24, 2012   (DE) .......................... 10 2012 101 516

(51) Int. Cl.
*H02H 7/00* (2006.01)
*H02H 7/10* (2006.01)
(Continued)

(52) U.S. Cl.
CPC ................ *H02H 7/10* (2013.01); *B25J 9/1674* (2013.01); *G05B 9/02* (2013.01); *H02H 3/20* (2013.01); *H02H 3/207* (2013.01); *H02H 3/24* (2013.01); *H02H 3/26* (2013.01)

(58) Field of Classification Search
CPC ...................................................... H02H 7/10
USPC .......................................................... 361/18
See application file for complete search history.

(56) References Cited

U.S. PATENT DOCUMENTS 4,016,457 A * 4/1977 Frait ...................... B60T 8/885
                                                                    324/503
5,737,168 A * 4/1998 Baker ..................... H02H 3/207
                                                                    361/84
(Continued)

FOREIGN PATENT DOCUMENTS

AT        385 866        5/1988
CN        2362232 Y      2/2000
(Continued)

OTHER PUBLICATIONS

Norm EN 954-1; Safety-related parts of control systems; Mar. 1997; 34 pp.

(Continued)

*Primary Examiner* — Stephen W Jackson
(74) *Attorney, Agent, or Firm* — Harness, Dickey & Pierce, P.L.C.

(57) ABSTRACT

A safety switching device for switching on or off a hazardous installation in a failsafe manner has a failsafe control/evaluating unit and a power supply for providing at least one operating voltage for the control/evaluating unit. The power supply has a voltage converter for converting an input voltage into an output voltage of a defined output voltage value. The output voltage corresponds to the operating voltage. The power supply has a fault detector for detecting a fault condition of the voltage converter. The fault detector has a comparator for comparing a currently existent output voltage with a defined reference voltage. The fault detector provides a fault condition signal upon detection of a predetermined deviation from the reference voltage. The power supply also has a switch which disconnects the input voltage of the voltage converter when the fault condition signal is present.

16 Claims, 10 Drawing Sheets

(51) Int. Cl.
*G05B 9/02* (2006.01)
*B25J 9/16* (2006.01)
*H02H 3/20* (2006.01)
*H02H 3/24* (2006.01)
*H02H 3/26* (2006.01)

(56) References Cited

U.S. PATENT DOCUMENTS

| | | | |
|---|---|---|---|
| 5,897,596 | A | 4/1999 | Kabune et al. |
| 5,936,435 | A | 8/1999 | Schwenkel et al. |
| 6,127,882 | A * | 10/2000 | Vargha .................. H02H 9/004 327/540 |
| 6,418,002 | B1 | 7/2002 | Yang et al. |
| 7,135,845 | B2 | 11/2006 | Zverev et al. |
| 7,596,436 | B2 | 9/2009 | Falter et al. |
| 8,106,640 | B2 * | 1/2012 | Itakura .................. H02M 1/32 323/272 |
| 8,595,827 | B2 | 11/2013 | Zondler et al. |
| 2007/0133236 | A1 | 6/2007 | Usui |
| 2010/0123978 | A1 | 5/2010 | Lin et al. |
| 2013/0264890 | A1 | 10/2013 | Le et al. |

FOREIGN PATENT DOCUMENTS

| | | |
|---|---|---|
| DE | 36 38 035 A1 | 5/1988 |
| DE | 38 32 545 A1 | 3/1990 |
| DE | 44 43 862 A1 | 6/1996 |
| DE | 196 33 952 A1 | 2/1997 |
| DE | 103 03 246 B3 | 10/2004 |
| DE | 10 2004 020 539 B3 | 7/2005 |
| DE | 10 2004 020 995 A1 | 11/2005 |
| DE | 10 2006 004 558 A1 | 8/2007 |
| DE | 10 2008 051 514 A1 | 4/2010 |
| DE | 10 2008 060 010 A1 | 6/2010 |
| DE | 10 2010 054 386 B3 | 2/2012 |
| JP | 9-284994 | 10/1997 |

OTHER PUBLICATIONS

Norm EN ISO 13849-1; Safety of machinery—Safety-related parts of control systems—Part 1: General principles for design (ISO 13849-1:2006); Nov. 2006; 97 pp.
Safety of machinery—Notes on the application of standards EN 62061 and EN ISO 13849-1; Jun. 2007; 19 pp.
ISA/EP; International Search Report; mailed Apr. 19, 2013; 2 pp.
English language translation of International Preliminary Report on Patentability (Chapter 1); issued by WIPO Aug. 26, 2014; 12 pp.

* cited by examiner

SAFETY SWITCHING DEVICE WITH POWER SUPPLY

CROSS-REFERENCES TO RELATED APPLICATIONS

This application is a continuation of international patent application PCT/EP2013/052952 filed on Feb. 14, 2013 designating the U.S., which international patent application has been published in German language and claims priority from German patent application DE 10 2012 101 516.3 filed on Feb. 24, 2012. The entire contents of these priority applications are incorporated herein by reference.

BACKGROUND OF THE INVENTION

The present invention relates to a safety switching device for switching on or off a hazardous installation in a failsafe manner.

A safety switching device in terms of the present invention is a switching device designed for meeting the requirements of common safety standards for industrial machines, especially meeting the requirements for PL d (Performance Level d) according to the ISO 13849-1 and/or SIL 3 (Safety Integrity Level 3) according to EN/IEC 62061 or comparable safety standards. This includes especially safety relays, safety controllers and sensor and actuator modules which are used for controlling and performing safety-critical tasks in the field of industrial production environments. For example, safety relays are known which monitor the operating position of an emergency off button or of a protective door or the operating state of a light barrier, and switch off a machine or a machine installation in dependence thereon, if required. A failure of safety switching devices can have life-threatening consequences for machine personnel which is why safety switching devices may only be used when they are certified by competent supervisory authorities.

A prior art safety switching device is known, for example, from DE 10 2006 004 558 A1 which relates to a safety switching device for reliably switching off an electrical load. The safety switching device has an input for connecting a signaling device, a switching element at the output for reliably switching off the load, a control/evaluating unit which drives the switching element in response to the signaling unit, and a power supply for providing an operating voltage.

Quite generally, a power supply is used for providing a particular operating voltage for a device or an assembly, such as the control/evaluating unit, especially a different voltage than is provided by the power system. The power supply has a voltage converter, also called transformer, for converting an input voltage into an output voltage corresponding to the required operating voltage. The output voltage or operating voltage is typically a direct voltage. A distinction is made between external power supplies which are mostly connected to the device via a cable, and internal power supplies which are arranged inside the device or integrated therein.

In the case of external power supplies, a mains voltage at the input end which is provided by a public utility, for example, may be converted into an output voltage or operating voltage for electrical or electronic devices which cannot be operated with the existing mains voltage. For example, a power supply may generate from a mains voltage of 230 volt AC (alternating voltage) an operating voltage of 24 volt DC (direct voltage), which may be needed for operating a particular device.

In the case of safety switching devices, an external power supply having a maximum output voltage that does not exceed a value which is harmless to humans even in the case of component faults must normally be used for protection against hazardous body currents, for example a power supply with PELV (Protective Extra-Low Voltage) or SELV (Safety Extra-Low Voltage). Overvoltages, which might be fed into the safety switching device from the outside, have to be assumed with approx. 65 volts for contact protection. The nominal voltage is usually 24 volts. In the case of a power supply for a safety switching device, the input voltage is, therefore, usually a voltage which is lower than the mains voltage. For example, an input voltage of 24 volts may be converted into a lower output voltage such as, for example, 5 volts or a lower value.

The power supply of the safety switching device can be dimensioned, for example, in such a manner that it is not overloaded at a nominal voltage of, e.g. 24 volts, even when maximally 65 V are fed in. The overvoltage occurring externally can thus be controlled by a suitable circuit configuration and corresponding component selection. In case of component defects or component failures in the power supplies, however, a voltage of 65 V, fed in for example, could reach the internal components supplied by the power supply. If the normal operating voltage is 5 V or lower, for example, the components may then be destroyed in the case of internal component defects/failures. This may lead to an unsafe state of the safety switching device. It is desirable, therefore, to provide measures for controlling these overvoltages caused by internal component failures in the power supply.

In the safety switching devices previously known, power supply faults such as overvoltages caused by component defects were controlled by means of measures outside of the power supplies. An overvoltage which could destroy components fed by the power supply was accepted and controlled by monitoring measures and failsafe driving of the outputs.

SUMMARY OF THE INVENTION

Against this background, it is an object of the present invention to provide a safety switching device which has increased safety and/or provides for a more economic repair.

According to an aspect of the invention, there is provided a safety switching device for switching on or off a hazardous installation in a failsafe manner, comprising an input for receiving an input signal, comprising a failsafe control/evaluating unit which processes the input signal in order to generate an output signal for switching on or off the hazardous installation in dependence thereon, and comprising a power supply for providing at least one operating voltage for the control/evaluating unit, wherein the power supply has a voltage converter for converting an input voltage into an output voltage of a defined output voltage value, said output voltage corresponding to the operating voltage, wherein the power supply has a fault detector for detecting a fault condition of the voltage converter, wherein the fault detector has a comparator for comparing a currently present output voltage with a defined reference voltage, wherein the fault detector provides a fault condition signal upon detection of a particular deviation from the reference voltage, and wherein the power supply has a switch which disconnects the input voltage of the voltage converter when the fault condition signal is present.

The novel safety switching device thus uses internal monitoring of the output voltage of the voltage converter for switching off the input voltage of the voltage converter in the case of a fault (especially component defect/failure in the power supply). This means that the disconnection occurs upstream of the voltage measurement or voltage monitoring (especially upstream of the point at which the output voltage is measured or monitored), if seen in the direction of the current or signal flow of the power supply from the input to the output. In comparison to a disconnection downstream of the voltage measurement or voltage monitoring, the disconnection is more effective. In the case of a fault, the safety switching device itself switches off the power or the input voltage of the power supply, respectively. The fault condition detection and disconnection take place within the power supply. When the fault condition is detected, the power supply switches itself off. A hazard caused by power supply defects or voltage converter defects is switched off directly at the point of origin, i.e. the power supply or voltage converter, respectively. Thus, the voltage switching part causing the fault condition (especially overvoltage or undervoltage) is switched off. In other words, the cause of the fault condition is eliminated. In particular, an overvoltage or undervoltage is detected at the location of the possible origin and directly switched off there. This upstream disconnection avoids subsequent faults which could occur due to an active defective power supply, for example overtemperature or even fire in the safety switching device in which a safe state is no longer guaranteed. The novel safety switching device therefore provides for increased safety, particularly in the case of component defects or component failures in the power supply and provides for economic repair.

In a preferred refinement, the fault detector further has a memory for storing the fault condition signal. In particular, the memory can have an input connected to the comparator and at least one output activating the switch.

In this refinement, it is ensured that the input voltage remains disconnected when the output voltage is switched off after a detected fault condition (e.g. overvoltage or undervoltage). Safety can thus be increased even further. At the same time, the memory can be provided by an additional inexpensive component or, respectively, only a few additional inexpensive components. The additional expenditure and the additional costs are therefore low.

In a further refinement, the memory further has a second input which receives a signal for ending the storing of the fault condition signal when the input voltage is switched on.

In this refinement, the power-on reset is initiated by the power supply itself. For example, after the cause of the fault has been eliminated, the power supply can be taken into operation again by switching the input voltage on again or bringing it up again. This increases the availability of the safety switching device. The second input can be connected to the input voltage. The second input can be connected, for example, to a signal generator which generates the signal for ending the storing in response to the input voltage, especially a set signal or a set pulse.

In a further refinement, the memory is a bistable flipflop. In particular, the first input may be a reset input and/or the second input may be a set input of the bistable flipflop. As an alternative, the inputs can also be exchanged so that the first input can be a set input of the bistable flipflop and/or the second input can be a reset input of the bistable flipflop.

In this refinement, the bistable flipflop provides a simple implementation of the memory. A bistable flipflop is a particularly cost-effective additional component. A bistable flipflop (also called flipflop, particularly RS flipflop) is an electronic circuit which can assume one of two stable states and can store the state over a long period. In particular, the reset input can receive a reset signal from the comparator when the fault condition is detected and/or the set input can receive a set signal when the input voltage is switched on. As an alternative, the inputs may be exchanged as described above.

In a preferred refinement, the fault detector provides a fault condition signal upon detection of a particular exceedance of the reference voltage so that the fault condition corresponds to an overvoltage of the output voltage.

In this refinement, monitoring for overvoltage is provided. In particular, the fault detector detects overvoltages which are hazardous for the components supplied by the power supply. It is thus possible to prevent, for example, that components are destroyed.

In a further refinement, the fault detector provides a fault condition signal upon detection of a particular shortfall of the reference voltage so that the fault condition corresponds to an undervoltage of the output voltage.

In this refinement, monitoring for undervoltage is provided. In particular, the fault detector detects undervoltages which are hazardous for the components supplied by the power supply. For example, oscillation of components can thereby be prevented. This embodiment is particularly advantageous in combination with the preceding embodiment.

In a further refinement, the switch is arranged in the current path to an input of the voltage converter so that the switch interrupts the current supply to the input of the voltage converter when the fault condition signal is present.

In this refinement, a direct disconnection of the input voltage is provided. The disconnection is thus effected in a particularly simple and effective manner.

In a further refinement, the voltage converter has a switched-mode regulator for regulating a current flow through the voltage converter in order to keep the output voltage at the defined output voltage value. In particular, the switch for disconnecting the input voltage can be a switching transistor of the switched-mode regulator.

In this refinement, a switched-mode power supply with switched-mode regulator is provided. The power supply is thus a switched-mode power supply. It provides a constant and thus reliable output voltage. The reliability and safety of the safety switching device is thus increased and additionally a high efficiency is provided. If the switching transistor of the switched-mode regulator is used for disconnecting the input voltage, a switching transistor already present can be used for disconnecting the input voltage. Thus, no additional switching element is needed which minimizes the costs.

In a further refinement, the switched-mode regulator has an input for a switched-mode regulator supply voltage and the switch is arranged in the current path of the input for the switched-mode regulator supply voltage so that the switch interrupts the current supply to the input of the switched-mode regulator when the fault condition signal is present.

In this refinement, an indirect disconnection of the input voltage is provided by using a switched-mode power supply with switched-mode regulator. The disconnection is thus effected in a particularly efficient manner.

In a further refinement, the safety switching device further has at least one watchdog which is connected to the failsafe control/evaluating unit. In particular, the watchdog, upon detection of a fault condition of the control/evaluating unit, delivers a fault condition signal to the switch in order to disconnect the input voltage of the voltage converter.

In this refinement, an additional fault monitoring of the control/evaluating unit is provided in the form of a watchdog. The watchdog, after responding, also leads to the input voltage being disconnected. A watchdog is generally a component of the device which monitors the operation of one or more other components of the device. The watchdog is used here for monitoring the control/evaluating unit in order to preempt, for example, a complete failure of the device due to failure of the software. The watchdog is therefore used for monitoring the correct operability of the control/evaluating unit (e.g. CPU or microcontroller). The watchdog responds upon detection of a fault condition of the control/evaluating unit monitored. The watchdog then initiates a safety reaction by disconnecting the input voltage of the voltage converter. Disconnecting the input voltage or power supply, respectively, can thus prevent subsequent faults such as, for example, an oscillation of a driver in the drive of the outputs of the safety switching device.

In particular, the watchdog can be a hardware watchdog (HW watchdog). For example, the watchdog can be a separate component (outside the control/evaluating unit) with communication to the control/evaluating unit, or can be integrated in the control/evaluating unit. As an alternative, the watchdog can also be a software watchdog (SW watchdog). An SW watchdog is usually integrated in the control/evaluating unit and is used especially for monitoring the correct software program sequence of the control/evaluating unit.

In a further refinement, the failsafe control/evaluating unit has at least two processing units which process the input signal redundantly with respect to one another and perform logical signal combinations in order to generate the output signal in dependence thereon.

In this refinement, two redundant signal processing channels having in each case (at least) one processing unit are provided in order to thus meet the requirements of relevant safety standards. Thus, a multi-channel or two-channel safety switching device is provided. This enables a safety switching device to be provided which meets at least the category 3 of the required safety standard.

In a further refinement, the power supply is designed for generating a plurality of operating voltages for the failsafe control/evaluating unit. In particular, the power supply has several voltage converters in order to convert the input voltage into several output voltages of in each case one defined output voltage value, wherein said output voltages each corresponds to an operating voltage for the control/evaluating unit.

In this refinement, the power supply provides a plurality of operating voltages for the control/evaluating unit. In particular, several voltage converters may be used for generating a plurality of different output voltage values from the same input voltage. In the case of several voltage converters, only one common input voltage needs to be disconnectable in order to guarantee safety. The device can thus be implemented cost-effectively even with the presence of several operating voltages.

In a further refinement, the safety switching device further has an adder for providing an aggregate voltage which corresponds to the sum of the plurality of operating voltages. In particular, the aggregate voltage is the currently present output voltage for the comparator.

In this refinement, simple voltage monitoring is provided when several operating voltages are used. In particular, monitoring of the aggregate voltage is simpler than monitoring each individual voltage. The individual values of the output voltage and operating voltage, respectively, are added and the sum is monitored. The device can thus be implemented cost-effectively even when several operating voltages are provided.

In a further refinement, the at least two processing units use different operating voltages from the plurality of operating voltages generated by the power supply.

In this refinement, several separate or different voltages may be provided for a multi-channel safety switching device (i.e. with several signal processing channels). Due to the fact that the processing units of different signal processing channels use different operating voltages, the continued operation of the processing unit not affected by the fault or of the signal processing channel not affected by the fault is possible. This further increases the safety of the safety switching device.

In a further refinement, the failsafe control/evaluating unit has an input for receiving a status signal which is generated by the fault detector upon detecting a fault condition of the voltage converter. In particular, the failsafe control/evaluating unit can have a memory for storing a corresponding fault entry upon receiving the status signal.

In this refinement, the cause of the fault or failure of the safety switching device can be read out or checked later. This makes it possible to provide supply-failure-proof storage of supply voltage fault messages. If the fault detector has detected a fault condition or triggered the voltage monitor, the fault detector provides a corresponding message in the form of a status signal to the control/evaluating unit (e.g. CPU or microcontroller). Due to the energy buffering in the power supply, sufficient time remains for storing a corresponding fault entry in the memory, for example in an error stack. If the fault condition did not result in a permanent destruction of the control/evaluating unit, i.e. was only a temporary disturbance, or if the power supply can be replaced, the cause of the failure of the safety switching device can be read out of the memory (e.g. error stack), for example, after restarting the device. This increases the user-friendliness of the device and can further increase the safety.

In a further refinement, the safety switching device, particularly the fault detector and the switch, are designed for a maximum overvoltage occurring in the case of a fault. For example, the overvoltage occurring maximally in the case of a fault may be 60 V or 65 V. In this embodiment, overvoltages fed into the safety switching device from outside are accepted up to the maximum overvoltage occurring in the case of a fault. Thus, contact protection or contact safety of the safety switching device is provided. The maximum overvoltage occurring in the case of a fault is selected in such a manner that a user can touch the safety switching device or the power supply without injury or damage (e.g. 65 volts). This reduces the risk of injury.

In a further refinement, the power supply further has an output filter at its output. In particular, the fault detector is arranged before the output filter. In other words, in particular, the fault detector (or the place at which the output voltage is measured) is followed by an output filter. The voltage monitor or the fault detector is thus arranged within the power supply and preceding the output filter. The fault condition or voltage error is thus detected at the nearest point with respect to its location of origin (e.g. in the voltage converter). This results in the shortest possible fault response time.

It goes without saying that the features mentioned above and those to be explained in the following text can be applied not only in the combination specified in each case but also in other combinations or by themselves without departing from the context of the present invention.

BRIEF DESCRIPTION OF THE DRAWINGS

Exemplary embodiments of the invention are shown in the drawings and will be explained in greater detail in the subsequent description. In the drawings.

DESCRIPTION OF PREFERRED EMBODIMENTS

Figure 1:
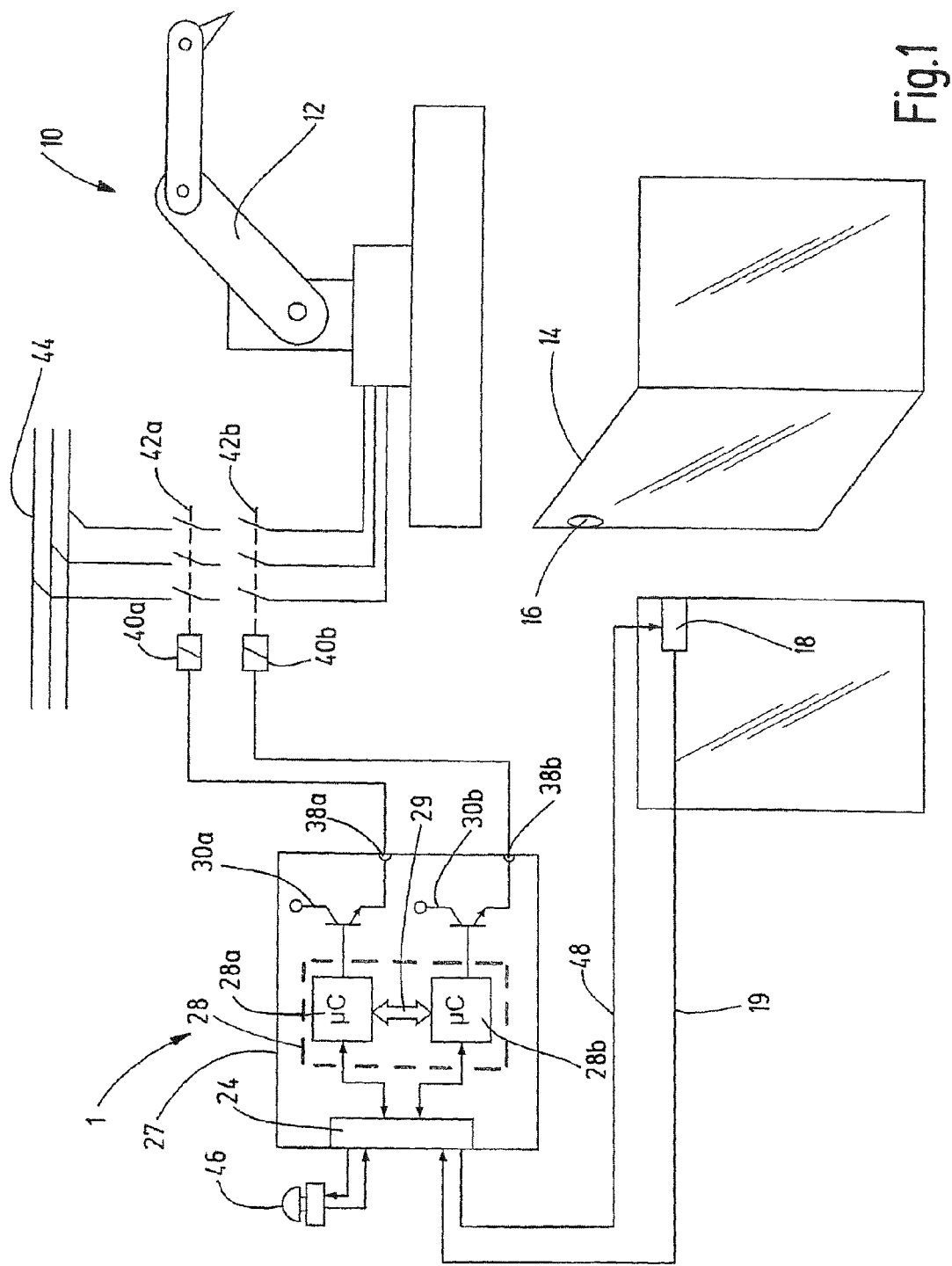
FIG. 1 shows a simplified representation of an illustrative embodiment of the safety switching device.

FIG. 1 shows a simplified representation of an illustrative embodiment of the safety switching device 1 for switching on or off a hazardous installation 10 in a failsafe manner. In other words, the safety switching device 1 is used for safety tasks. The installation 10 comprises in this case, by way of example, a robot 12, the movements of which in operating mode represent a hazard for persons located within operating range of the robot 12. For this reason, the operating range of the robot 12 is safeguarded with a protective fence having a protective door 14. The protective door 14 allows access into the operating room of the robot 12, for example for maintenance work or for setting-up work. In normal operating mode, however, the robot 12 is only allowed to operate when the protective door 14 is closed. As soon as the protective door 14 is opened, the robot 12 must be disconnected or brought into a safe state in another suitable manner.

To detect the closed state of the protective door 14, a protective-door switch having a door part 16 and a frame part 18 is mounted on the protective door 14. The frame part 18 generates on a line 19 a protective-door signal which is supplied to the novel safety switching device 1 via line 19.

The safety switching device 1 has at least one input for receiving an input signal, for example at least one first input for receiving the protective-door signal transmitted via the line 19. In the present illustrative embodiment, the safety switching device 1 has an I/O part 24 with a plurality of inputs and outputs. The inputs and outputs are designed in the form of connections. In some illustrative embodiments, the connections are terminals or terminal blocks which are arranged on a housing side of the housing 27 of the safety switching device 1. For example, they can be spring-type terminals or screw-type terminals. In other illustrative embodiments, the connections can be plugs or sockets which contain a number of contact elements (pins), one pin in each case forming a connection. Frequently, M8 sockets having five contact pins are used for connecting signaling devices or other sensors at the field level. Correspondingly, illustrative embodiments of the novel safety switching device 1 can be or comprise field devices which are arranged outside a switch gear cabinet spatially close to the robot 12.

The safety switching device 1 also has a failsafe control/evaluating unit 28. The control/evaluating unit 28 processes the input signal, for example the protective-door signal transmitted via the line 19 in order to generate in dependence thereon an output signal for switching on or off the hazardous installation 10. In the present illustrative embodiment, the failsafe control/evaluating unit 28 has two processing units 28a, 28b. The processing units 28a, 28b can be provided, for example, in the form of microcontrollers. The processing units 28a, 28b are here connected in each case to the I/O part 24. The processing units 28a, 28b process the input signal redundantly with respect to one another and perform logical signal combinations (e.g. by comparing the signals, which is shown by means of an arrow 29 in FIG. 1) in order to generate the output signal in dependence thereon. In the present illustrative embodiment, the safety switching device 1 therefore has two redundant signal processing channels. The processing units can be provided, for example, in the form of microcontrollers. Instead of two microcontrollers, microprocessors, ASICs, FPGAs and/or other signal processing circuits can be used. The output signal is used for actuating a switching element for disconnecting the robot 12. Such a safety switching device 1 can therefore be used for disconnecting the installation 10, in this case the robot 12, in a failsafe (FS) manner.

In the case shown here, the safety switching device 1 has two redundant switching elements 30a, 30b. Each of these two switching elements is capable of switching a high voltage potential through to an output or device connection 38a, 38b of the safety switching device 1 in order to provide for a current flow to a contactor 40a, 40b or to interrupt this current flow. Each of the switching elements 30 can thus disconnect an actuator such as a contactor or a solenoid valve.

The contactors 40a, 40b have in each case normally-open contacts 42a, 42b. The normally-open contacts 42a, 42b are here arranged in series with one another in a power supply path from a power supply 44 to the robot 12. As soon as the safety switching device 1 disconnects the contactors 40a, 40b, the contacts 42 drop off and the power supply for the robot 12 is disconnected. The relevant experts know that such a "radical" disconnection is described here by way of example. In deviation from this, only parts of the robot 12 can be disconnected in the case of a safety requirement, such as, for instance, the hazardous drives, whilst other parts of the robot 12 remain operable. A delayed disconnection is also conceivable so that the robot 12 may be slowed down in a controlled manner before the drives are disconnected.

In this illustrative embodiment, the safety switching device 1 actuates the switching elements 30a, 30b in dependence on the signal of the protective-door switch on line 19 and in dependence on a further input signal from an emergency-off button 46. The emergency-off button 46 is also connected to device connections of the safety switching device 1 via lines. In particular, the safety switching device has a second input for receiving the input signal from the emergency-off button 46. Each of the input signals can preferably be present redundantly or, respectively, two input and output lines or connections can be provided in each case (not shown in FIG. 1). In the example shown in FIG. 1, two input lines or inputs can therefore be provided for the emergency-off button 46 which in each case provides one input signal from the emergency-off button 46. This similarly applies to the signal of the protective-door switch.

In some illustrative embodiments, the safety switching device 1 generates output signals which are supplied to the individual signaling devices. For example, such an output signal is conducted via a line 48 to the frame part 18 of the protective-door switch. The frame part 18 loops the output signal of the safety switching device 1 from line 48 to line 19 when the door part 16 is located in the vicinity of the frame part 18, that is to say when the protective door 14 is closed. The safety switching device 1 can therefore monitor the protective-door switch with the aid of the output signal on line 48 and with the aid of the input signal on line 19. In comparable manner, the safety switching device 1 monitors here the emergency-off button 46.

In deviation from the representation in FIG. 1, two redundant output signals of the safety switching device 1 are frequently used in practice which are in each case conducted via a separate signal line to a signaling device and looped back via this signaling device to the safety switching device 1. As an example of such an implementation, reference is made to DE 10 2004 020 995 A1 which is incorporated by reference with regard to the details of such a redundant monitoring of a signaling device. In practice, the emergency-off button 46 is also frequently monitored by means of redundant input and output lines as mentioned above.

Figure 2:
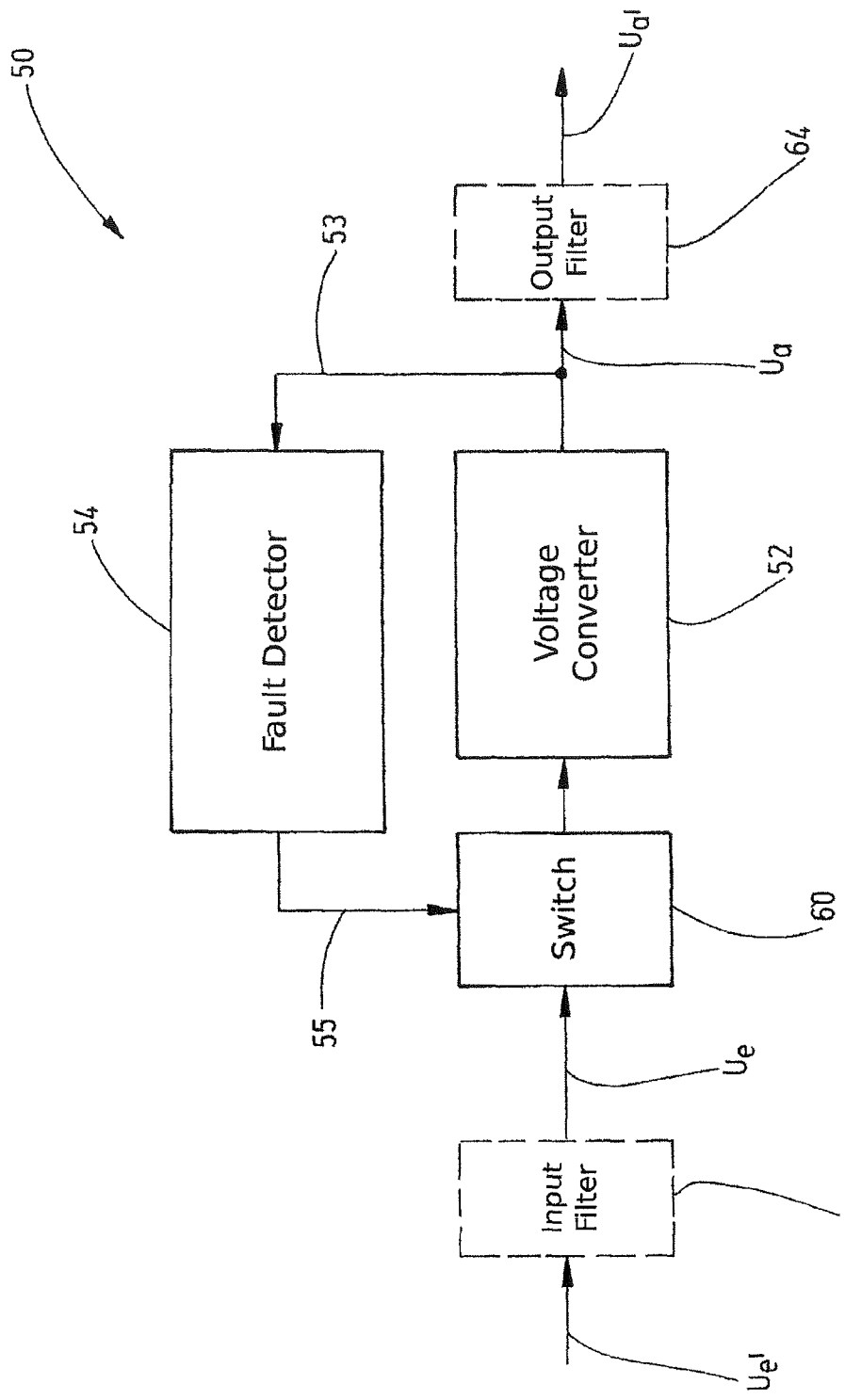
FIG. 2 shows a simplified representation of a first illustrative embodiment of the power supply of the novel safety switching device.

The safety switching device 1 has a power supply for providing at least one operating voltage for the control/evaluating unit 28. FIG. 2 shows a simplified representation of a first illustrative embodiment of the power supply 50 of the novel safety switching device 1. The power supply 50 has a voltage converter 52 for converting an input voltage $U_e$ into an output voltage $U_a$, corresponding to the operating voltage, of a defined output voltage value. In particular, the voltage converter 52 is a direct-voltage converter (DC-DC converter) which converts a direct voltage as input voltage $U_e$ into a direct voltage as output voltage $U_a$. The voltage converter 52 can be, for example, a step-down converter (also called down converter) in which the defined output voltage value is lower than the voltage value of the input voltage. The voltage converter can be, for example, a blocking transformer (also called step-up/down converter) which has electrical isolation. As an alternative, the voltage converter can also have no electrical isolation (e.g. step-down converter without electrical isolation).

The power supply 50 has a fault detector 54 for detecting a fault condition of the voltage converter 52. The fault detector 54 has a comparator for comparing the output voltage $U_a$ currently present with a defined reference voltage. The fault detector 54 or its input, respectively, is connected via an electrical connection 53 to the output voltage $U_a$ or the output, respectively, of the voltage converter 52. Upon detection of a predetermined deviation from the reference voltage, the fault detector 54 and its output, respectively, deliver a fault condition signal. In particular, the fault detector 54 can deliver a fault condition signal upon detection of the output voltage $U_a$ exceeding the reference voltage by a predetermined amount, i.e. on detection of the fault condition. The fault condition then corresponds to an overvoltage of the output voltage $U_a$. This provides overvoltage monitoring. As an alternative or cumulatively, the fault detector 54 can deliver a fault condition signal upon detection of a predetermined shortfall below the reference voltage. The fault condition then corresponds to an undervoltage of the output voltage $U_a$. This provides overvoltage monitoring or overvoltage and undervoltage monitoring, respectively.

The power supply 50 also has a switch 60. The switch 60 and the fault detector 54 are connected to one another via an electrical connection 55. On detection of a particular deviation from the reference voltage, i.e. on detection of the fault condition, the fault detector 54 delivers the fault condition signal via the electrical connection 55 to the switch 60. When the fault condition signal is present, the switch 60 disconnects the input voltage $U_e$ of the voltage converter 52.

The fault condition detection and disconnection therefore takes place within the power supply 50. Upon detection of the fault condition, or in the case of the presence of the fault condition signal, the power supply 50 disconnects itself. The novel safety switching device uses monitoring of the output voltage $U_a$ of the voltage converter 52 for disconnecting the input voltage $U_e$ of the voltage converter 52 in the case of a fault or in the case of the presence of the fault condition signal (especially due to component defect/failure in the power supply). Referred to the direction of current or signal flow of the power supply 50 (from input to output), disconnection occurs upstream of the fault detector 54 or, respectively, the point at which the voltage $U_a$ is monitored. Any hazard caused by power supply or voltage converter defects is switched off directly at the point of origin, i.e. the power supply or voltage converter, respectively. Thus, the voltage circuit part causing the fault condition (especially overvoltage or undervoltage) is disconnected. In other words, the cause of the fault condition is eliminated.

Optionally, the power supply 50 can still have at its input an input filter 62 (shown dashed in FIG. 2) which converts or filters the input voltage $U_e'$ into the input voltage $U_e$. The input filter 62 can be, for example, an EMC filter or the like. It should be understood that the input voltage $U_e$ and $U_e'$ can be used mutually exchangeably. Optionally, the power supply 50 can still have at its output an output filter 64 (shown dashed in FIG. 2), especially with buffer which converts or filters the output voltage $U_a$ into an output voltage $U_a'$. The output filter 64 can be, for example, a smoothing filter. It should be understood that the input voltage $U_a$ and $U_a'$ can be used mutually exchangeably.

In the illustrative embodiment shown in FIG. 2, the fault detector 54 is arranged upstream of the output filter 64, referred to the direction of current or signal flow of the power supply 50 (from input to output). In other words, the fault detector 54, especially the point at which the output voltage $U_a$ is measured or picked up by the fault detector 54 or comparator 56, is followed by the output filter 64. The voltage monitor or the fault detector 54, respectively, is thus arranged inside the power supply 50 and before the output filter 64. The fault condition or voltage fault, respectively, is thus detected at the nearest point to its location of origin, for example in the voltage converter 52.

The safety switching device, especially the fault detector 54 and the switch 60 can be designed for a maximum overvoltage occurring in the case of a fault. For example, the maximum overvoltage occurring in the case of a fault can be 60 V or 65 V. This provides contact protection for the safety switching device. The maximum overvoltage occurring in the case of a fault is selected in such a manner that a user can touch the safety switching device or the power supply, respectively, without injury or damage.

Figure 3:
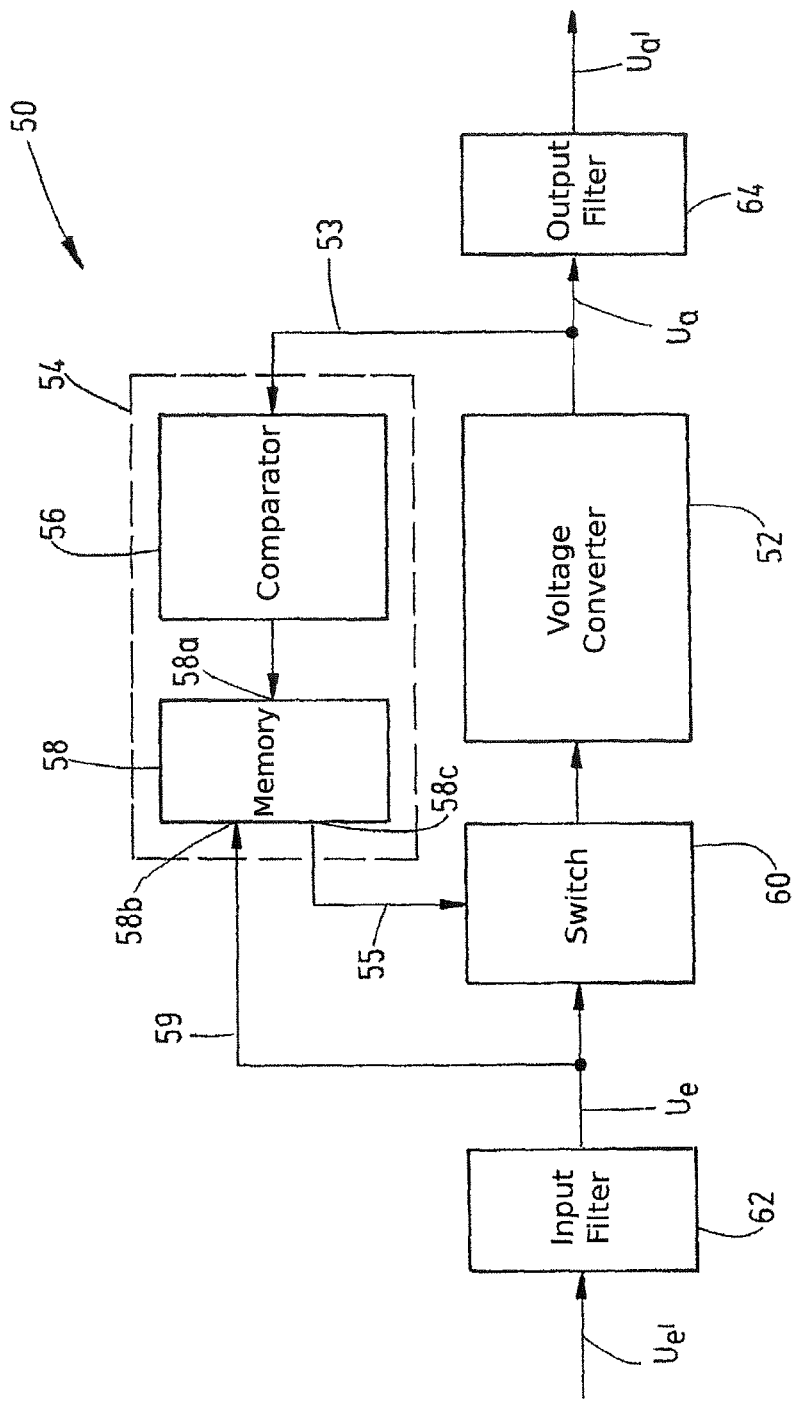
FIG. 3 shows a simplified representation of a second illustrative embodiment of the power supply of the novel safety switching device.

FIG. 3 shows a simplified representation of a second illustrative embodiment of the power supply of the novel safety switching device. The second illustrative embodiment of FIG. 3 is based on the first illustrative embodiment of FIG. 2 so that the explanations regarding FIG. 2 also apply to FIG. 3. In the illustrative embodiment of FIG. 3, the fault detector 54 also has, in addition to the comparator 56, a memory 58 for storing the fault condition signal. The comparator 56 or its input, respectively, is connected via the electrical connection 53 to the output voltage $U_a$. The memory 58 has a first input 58a, connected to the comparator 56, and at least one output 58c activating the switch 60. The output 58c is connected via the electrical connection 55 to the switch 60 in order to deliver the fault condition signal to the switch 60 via the electrical connection 55 on detection of the fault condition. The memory 58 also has a second input 58b which is connected to the input voltage $U_e$ via an electrical connection 59. When the input voltage $U_e$ is switched on again, the memory 58 receives a signal for ending the storing of the fault condition signal via the electrical connection 59 so that a power-on reset is performed. The memory 58 can be implemented, for example, in the form of a bistable flipflop, particularly an RS flipflop. However, any other suitable type of fault condition signal storage is also conceivable.

Figure 4:
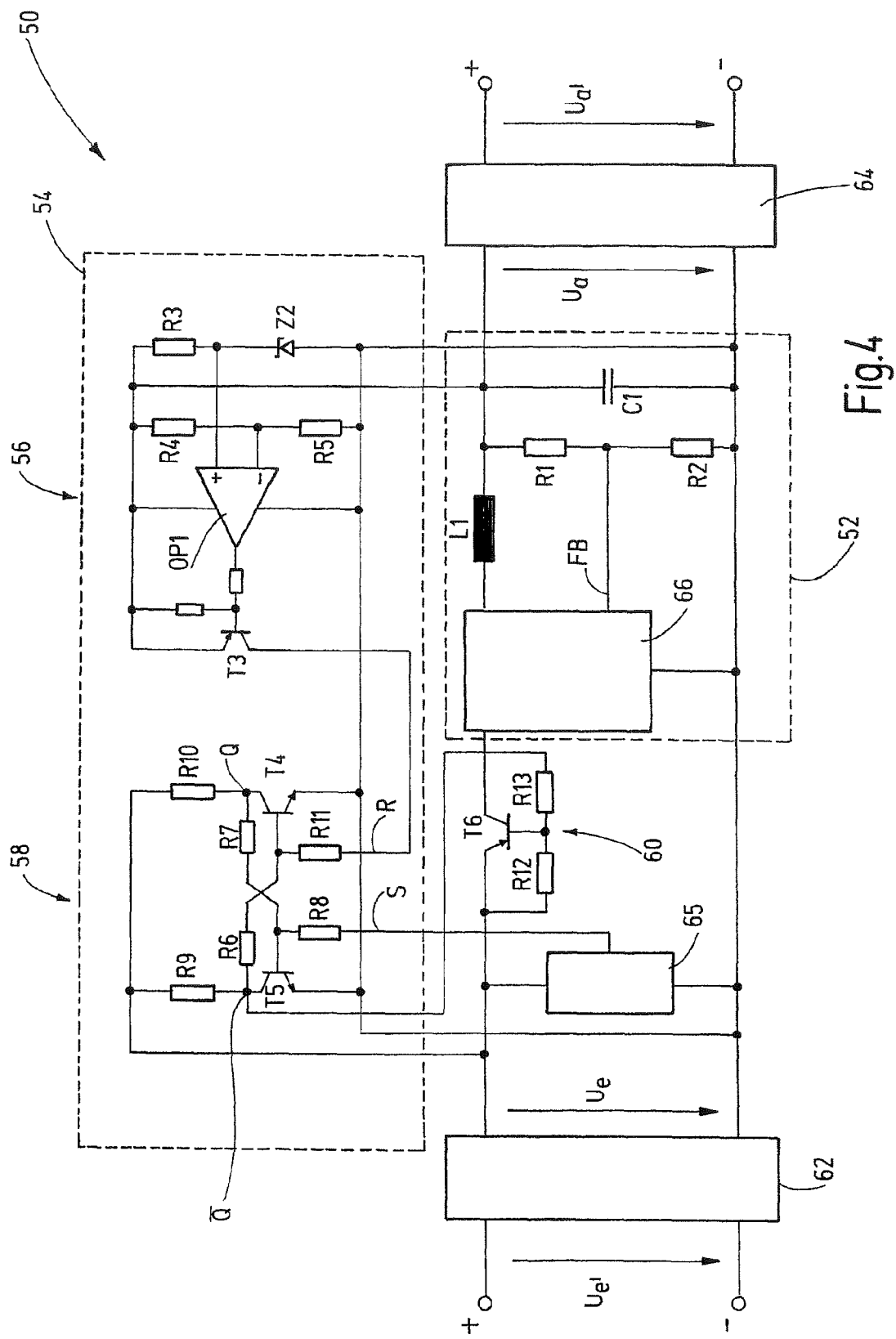
FIG. 4 shows a block diagram of a first illustrative implementation of the illustrative embodiment of FIG. 3.
Figure 5:
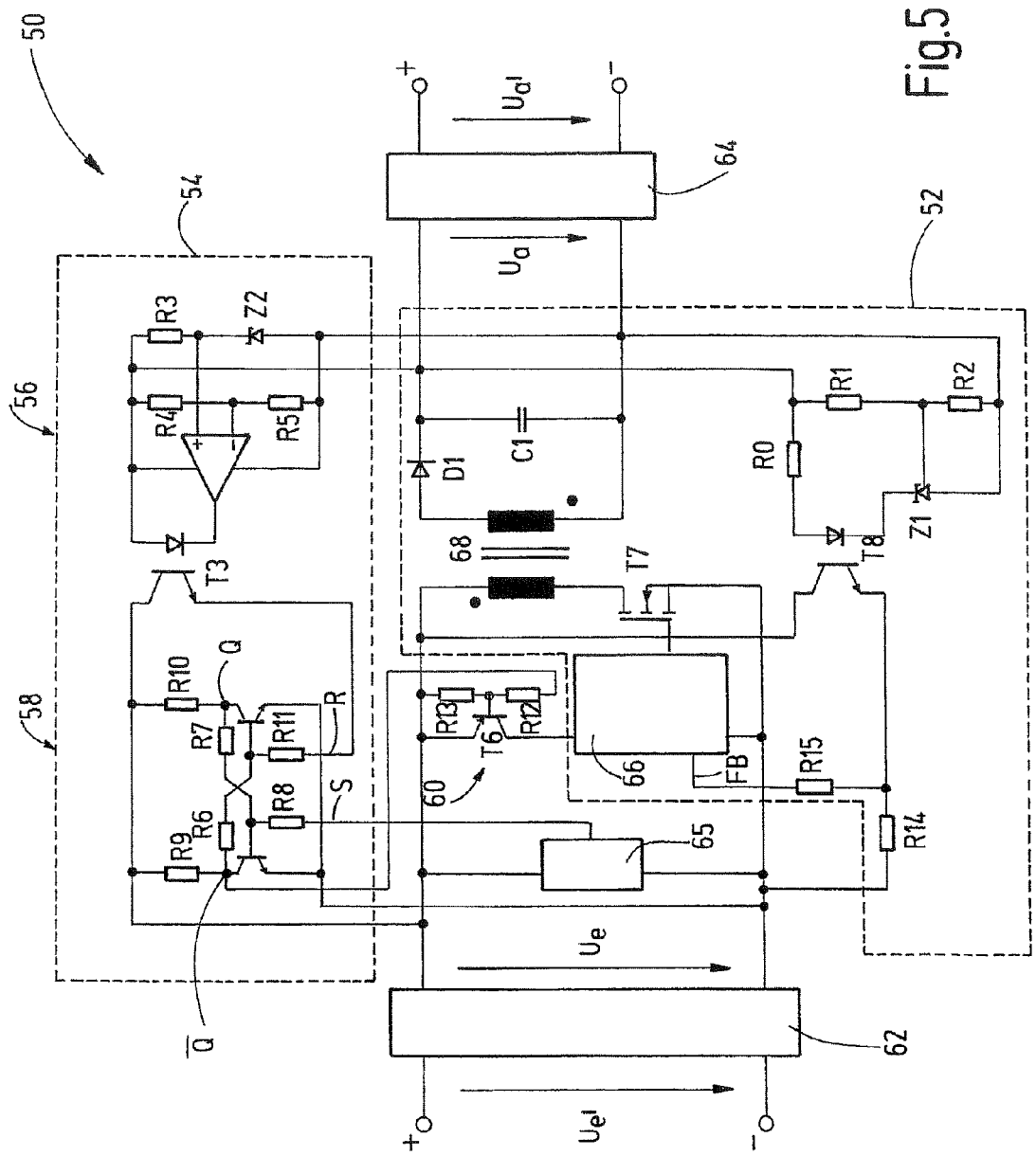
FIG. 5 shows a block diagram of a second illustrative implementation of the illustrative embodiment of FIG. 3.

FIG. 4 shows a block diagram of a first illustrative implementation of the illustrative embodiment of FIG. 3 and FIG. 5 shows a block diagram of a second illustrative implementation of the illustrative embodiment of FIG. 3. However, it should be understood that the illustrative implementations of FIG. 4 and FIG. 5 are purely illustrative and that any other suitable type of implementation can be provided. In the illustrative implementation of FIG. 4 or FIG. 5, the comparator 56 is implemented in the form of a comparator amplifier. The comparator is here an operational amplifier OP1 interconnected to form a comparator. The comparator 56 has an operational amplifier OP1 having two inputs, to the first input of which a threshold value switching element Z2 is connected and to the second input of which a voltage divider having voltage divider resistors R4, R5 is connected. Additionally, a further resistor R3 is connected to the first input which forms a voltage divider with the threshold value switching element Z2. The threshold value switching element Z2 delivers the reference voltage or specifies it, respectively. In the present example, the threshold value switching element Z2 is a Zener diode. However, it should be understood that any other suitable type of threshold value switching element can also be provided.

In the illustrative implementation of FIG. 4 or FIG. 5, the memory 58 is a bistable flipflop. In this example, the first input 58a of the memory 58 is a reset input R of the bistable flipflop and the second input 58b of the memory 58 is a set input S of the bistable flipflop. The output of the memory activating the switch 60 is here an output of the bistable flipflop. The other output Q of the bistable flipflop is unused in the present example. The reset input R of the bistable flipflop is connected to the comparator 56, more precisely to the driver stage (with transistor T13) at the output of the operational amplifier OP1. The reset input R thus receives a reset signal from the comparator 56 on detection of the fault condition. The set input S receives a set signal when the input voltage $U_e$ is switched on so that the bistable flipflop "flips" in order to initiate the power-on reset in this manner.

In this illustrative embodiment, the safety switching device has a signal generator 65 which generates a set signal in dependence on the input voltage $U_e$. For example, the set signal generator 65 can be designed for generating the set signal with a particular, for example, ramp-shaped rise in the input voltage $U_e$. An illustrative implementation of the set signal generator 65 will be explained with reference to FIG. 10 in the text which follows.

It is known that a bistable flipflop (also called flipflop) is an electronic circuit which can assume two stable states and thus store a set of data of one bit over a long period. In particular, the bistable flipflop can be an RS flipflop as shown in the illustrative implementation of FIG. 3 or FIG. 4. The bistable flipflop in the form of an RS flipflop has the following table of levels, where H (HIGH) stands for a high level and L (LOW) stands for a low level. It should be understood that, in particular, in the case of the R and S inputs, the low level L can also mean "high impedance", for example due to blocked transistors.

| R | S | Q | Q̄ | State |
|---|---|---|---|---|
| H | H | L | L | Illegal |
| H | L | L | H | Resetting |
| L | H | H | L | Setting |
| L | L | as before | as before | Storing |

In the illustrative implementation of FIG. 4 or FIG. 5, overvoltage monitoring is realized. It is assumed that, if there is no fault condition, the output voltage $U_a$ corresponds to the defined output voltage value and that when a fault condition is present, the output voltage $U_a$ is higher than the defined output voltage value. The fault condition thus corresponds to an overvoltage of the output voltage $U_a$. That is to say the fault condition detector 54 delivers the fault condition signal upon detection of a particular exceedance of the reference voltage which is specified here by the threshold value switching element or the Zener diode Z2, respectively. The Zener diode is selected here in such a manner that its breakdown voltage is less than the defined output voltage value of the output voltage $U_a$.

If no fault condition is present, the output voltage $U_a$ is greater than the breakdown voltage and the breakdown voltage is dropped across the Zener diode Z2 as reference voltage. At the non-inverting input of the operational amplifier OP1, a greater voltage is then present than at the inverting input. In other words, a higher voltage is present at the non-inverting input than the voltage across the resistor R5, i.e. at the inverting input, due to the voltage divider R4, R5. The voltage between the non-inverting and the inverting input of the operational amplifier OP1 is thus positive. Correspondingly, a high level (H) is present at the output of the operational amplifier OP1. As a result, the transistor or optocoupler output T3 of the driver stage is cut off at the output of the operational amplifier OP1. The first npn-transistor T4 of the bistable flipflop 58 is cut off and the second npn-transistor T5 of the bistable flipflop 58 conducts and pulls the output to a low level (L) which allows the pnp-transistor T6 of the switch 60 to conduct. Thus, there is always an input voltage $U_e$ present at the voltage converter 52 in the non-fault case.

When the fault condition or fault case occurs due to an overvoltage at $U_a$, the voltage (matched via the voltage divider R4, R5) across the resistor R5 rises above the breakdown voltage of the Zener diode Z2. At the non-inverting input of OP1, a lower voltage is then present than the voltage at the inverting input. The voltage between non-inverting and inverting input of the operational amplifier OP1 thus becomes negative. As a result, a low level (L) is present at the output of the operational amplifier OP1. This leads the transistor or optocoupler output T3 of the driver stage at the output of OP1 to conduct. As a result, the reset input R becomes active. The voltage which is applied to the first npn-transistor T4 causes transistor T4 to conduct and pulls the output Q to a low level (L) and the output to a high level (H) which cuts off the pnp-transistor T6 of the switch 60. Thus, there is no input voltage $U_e$ at the voltage converter 52 when the fault condition or fault case is present.

As long as the reset input R is at a lower level (L) or has a high impedance, respectively, when the fault condition is present, and the set input S is also at a low level (L) or has a high impedance, respectively, there is no change in the levels present at the output Q and output. The bistable flipflop retains its assumed state and thus serves as storage device for storing the fault condition. It is only when the input voltage $U_e$ is switched on again that a high level (H) is generated in the set signal generator 65 and applied to the set input S. the point thus comes to a lower level (L). That is to say the bistable flipflop "flips" in this case. As a result, transistor T6 of the switch 60 also conducts again.

Figure 10:
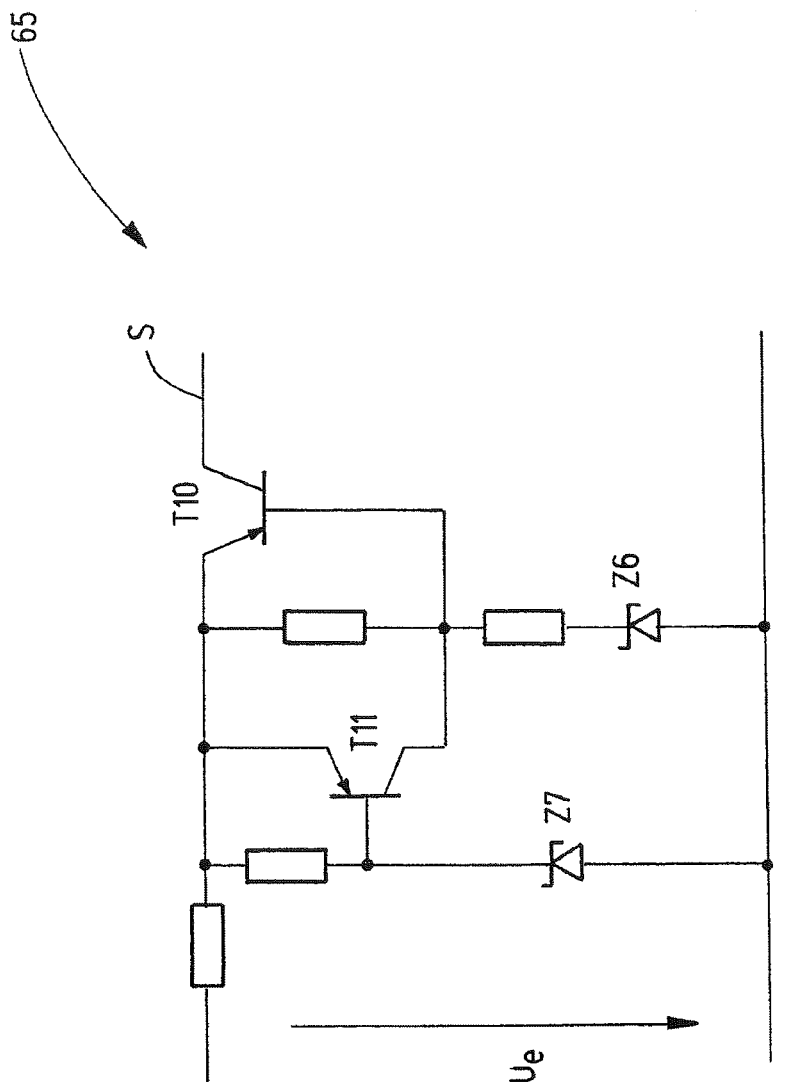
FIG. 10 shows a block diagram of an illustrative implementation of a set signal generator.

Purely illustratively, FIG. 10 shows a block diagram of an illustrative implementation of a set signal generator 65. However, it should be understood that the illustrative implementation of FIG. 10 is purely illustrative and that any other suitable type of implementation can be provided. The set signal generator 65 of FIG. 10 comprises two (pnp)-transistors T10, T11 and two Zener diodes Z6, Z7. The Zener diodes Z6 and Z7 are operated here in the reverse direction. If the input voltage $U_e$ is lower than the breakdown voltage of the Zener diodes Z6, Z7, Zener diodes Z6, Z7 are cut off. When the breakdown voltage is exceeded, the Zener diodes Z6, Z7 become conductive in the reverse direction and keep the breakdown or Zener diode voltage almost constant. The voltage difference between the breakdown voltage and the applied voltage or the input voltage $U_e$ is dropped across the preceding resistors. Purely illustratively, it shall be assumed that the transistors T10, T11 become conductive in the case of an emitter/base voltage of approx. 1 V.

Because of the capacitances (e.g. in the input filter 62) and the limited input current, the input voltage $U_e$ rises in ramp-like manner after power-on. As long as the input filter $U_e$ is lower than the breakdown voltage (e.g. 8 V) of the Zener diode Z6, all current paths in the above circuit are currentless. The set signal S is then at a low level (L) or has a high impedance, respectively. Above an input voltage $U_e$ slightly above the breakdown voltage of the Zener diode Z6 (e.g. above about 9 V with a breakdown voltage of 8 V) or at a certain emit-ter/base voltage (e.g. 1 V), the transistor T10 is conducting. The set signal S then assumes the input voltage $U_e$ or is at a high level (H), respectively. Above an input voltage $U_e$ of slightly above the breakdown voltage of the Zener diode Z7 (e.g. above about 14 V with a breakdown voltage of 13 V) or at a certain emit-ter/base voltage (e.g. 1 V), the transistor T11 is conducting. As a result, the emitter/base voltage of the transistor T10 is short circuited and the transistor T10 is reset into its blocked state. The set signal S is therefore at a low level (L) or has a high impedance again. By means of the set signal S thus generated, also called set pulse, the output is set to a low level (L) or ground potential, respectively, at the bistable flipflop or at the RS flipflop, respectively. As a result, the transistor T6 of the switch 60 starts to conduct and the switch 60 is thus switched on. Thus, the set signal S is generated here with a particular (ramp-like) rise of the input voltage.

In the illustrative implementation of FIG. 4, the voltage converter is a step-down converter without electrical isolation. In the illustrative implementation of FIG. 5, the voltage converter is a blocking transformer (step-up/down converter) which has an electrical isolation in the form of a transformer 68. In this illustrative implementation of FIG. 4 or of FIG. 5, the voltage converter 52 is therefore implemented in the form of a conventional voltage converter so that a detailed explanation of the structure of the voltage converter is omitted at this point. However, it must be noted that in the illustrative implementation of FIG. 4 or of FIG. 5, the voltage converter 52 has a switched-mode regulator 66 for regulating a current flow through the voltage converter 52 in order to keep the output voltage $U_a$ at the defined output voltage value.

In the illustrative implementation of FIG. 4, the switch 60 is arranged in the current path to the input of the voltage converter 52 so that the switch 60 interrupts the power supply to the input of the voltage converter 52 when the fault condition signal is present. This provides a direct disconnection of the input voltage $U_e$. As mentioned above, the voltage converter is a step-down converter without electrical isolation in the illustrative implementation of FIG. 4. In the example of FIG. 4, an overvoltage of the output voltage $U_a$ can be caused, for example, by defects in the switched-mode regulator 66 or the voltage divider resistors R1, R2. As a rule, failures of the other components cannot generate an overvoltage of the output voltage $U_a$ or of the power supply 50, respectively. When a fault condition or overvoltage of the output voltage $U_a$ is detected, the input voltage $U_e$ is disconnected by the switch 60 or the transistor T6, respectively, before the switched-mode regulator 66. The voltage converter 52 or step-down converter can thus no longer deliver any current to the storage choke L1 and the output voltage $U_a$ is switched off. The input voltage $U_e$ remains disconnected even when the output voltage $U_a$ is switched off after the detected overvoltage. This is carried out by the memory 58, described above, in the form of the bistable flipflop after the comparator 56. It is attempted to switch the input voltage of the voltage converter 52 or step-down converter, respectively, on again only after the input voltage $U_e$ is switched on again.

Figure 6:
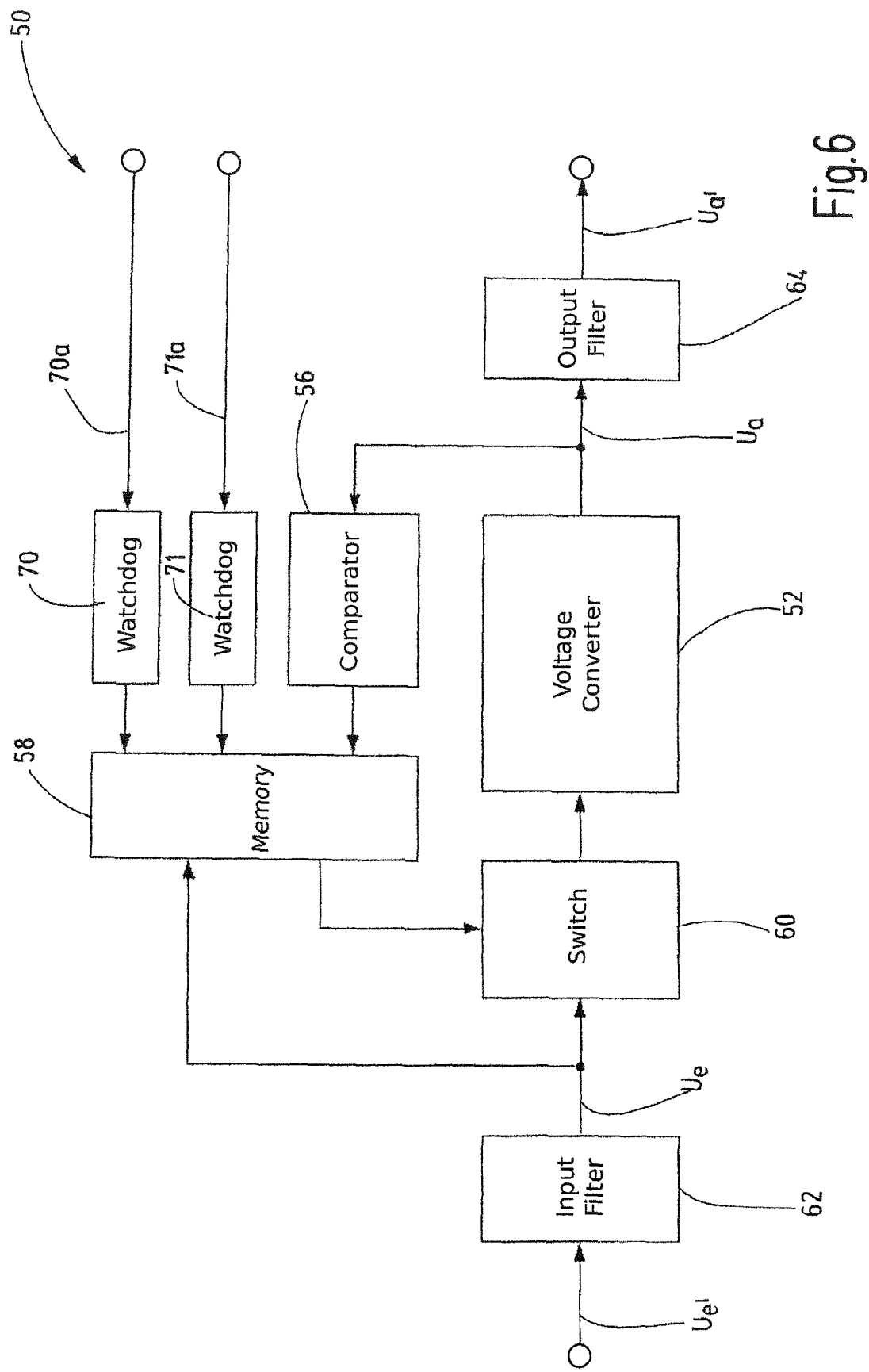
FIG. 6 shows a simplified representation of a further illustrative embodiment of the power supply of the novel safety switching device.

In the illustrative implementation of FIG. 5, the switched-mode regulator 66 has an input 67 for a switched-mode regulator supply voltage, the switch 60 being arranged in the current path of the input 67 for the switched-mode regulator supply voltage so that the switch 60 interrupts the current supply to the input 67 of the switched-mode regulator 66 when the fault condition signal is present. As mentioned above, in the illustrative implementation of FIG. 5, the voltage converter is a blocking transformer (or step-up/down converter) which has an electrical isolation in the form of a transformer 68. In the example of FIG. 6, an overvoltage of the output voltage $U_a$ can be caused, for example, by defects in the switched-mode regulator 66 or the adjustable Zener shunt regulator Z1 or the voltage divider resistors R1, R2. As a rule, failures of the other components can be excluded or lead to a harmless state of the power supply. If, for example, the field effect transistor (FET) T7 fails which switches the primary current through the transformer 68 on and off, no alternating voltage can be generated anymore and therefore no voltage can arise at the output of the transformer 68. In the case of a detected fault condition or overvoltage of the output voltage $U_a$, the input voltage $U_e$ before the switched-mode regulator 66 is disconnected by the switch 60 or the transistor T6. The FET T7 of the voltage converter 52 or blocking transformer, respectively, can therefore no longer be activated and the output voltage $U_a$ is switched off. The input voltage $U_e$ remains disconnected even when the output voltage $U_a$ is switched off after the detected overvoltage. This is carried out by the memory 58, described before, in the form of the bistable flipflop after the comparator 56. It is attempted to switch the input voltage of the voltage converter 52 on again only after the input voltage $U_e$ is switched on again.

It should be understood that although analogue circuit technology has previously been described with reference to the illustrative implementation of FIG. 4 or of FIG. 5, the same functions can also be implemented by means of digital circuit technology.

FIG. 6 shows a simplified representation of a further illustrative embodiment of the power supply 50 of the novel safety switching device 1. The illustrative embodiment of FIG. 6 is based on the illustrative embodiment of FIG. 3 so that the explanations relating to FIG. 2 and FIG. 3 also apply to FIG. 6. In this illustrative embodiment of FIG. 6, the safety switching device 1 also has at least one watchdog. More precisely, a first watchdog 70 and a second watchdog 71 are provided in this illustrative embodiment. The first and second watchdog 70, 71 is in each case connected via an electrical connection 70a, 71a to the failsafe control/evaluating unit 28 (not shown in FIG. 6). In the illustrative embodiment of FIG. 6, the watchdog 70, 71 is in each case a separate component (outside the control/evaluating unit) having communication with the control/evaluating unit via the electrical connection 70a, 71a. For example, the first watchdog 70 can be connected to a first processing unit 28a and the second watchdog can be connected to a second processing unit 28b of the control/evaluating unit 28 such as, for example, the above-described processing units 28a, 28b, of two different redundant signal processing channels. The first and second watchdog 70, 71 in each case delivers a fault condition signal to the switch 60 upon detection of a fault condition of the control/evaluating unit 28 in order to disconnect the input voltage $U_e$ of the voltage converter 52. Thus, additional fault monitoring of the control/evaluating unit 28 is provided in the form of a watchdog 70, 71 (e.g. against a complete failure of the device due to software failure). The watchdog 70, 71 responds on detection of the fault condition of the control/evaluating unit 28 monitored and, after responding, also leads to disconnection of the input voltage $U_e$. The watchdog 70, 71 of FIG. 8 can be, for example, a hardware watchdog (HW watchdog).

Figure 7:
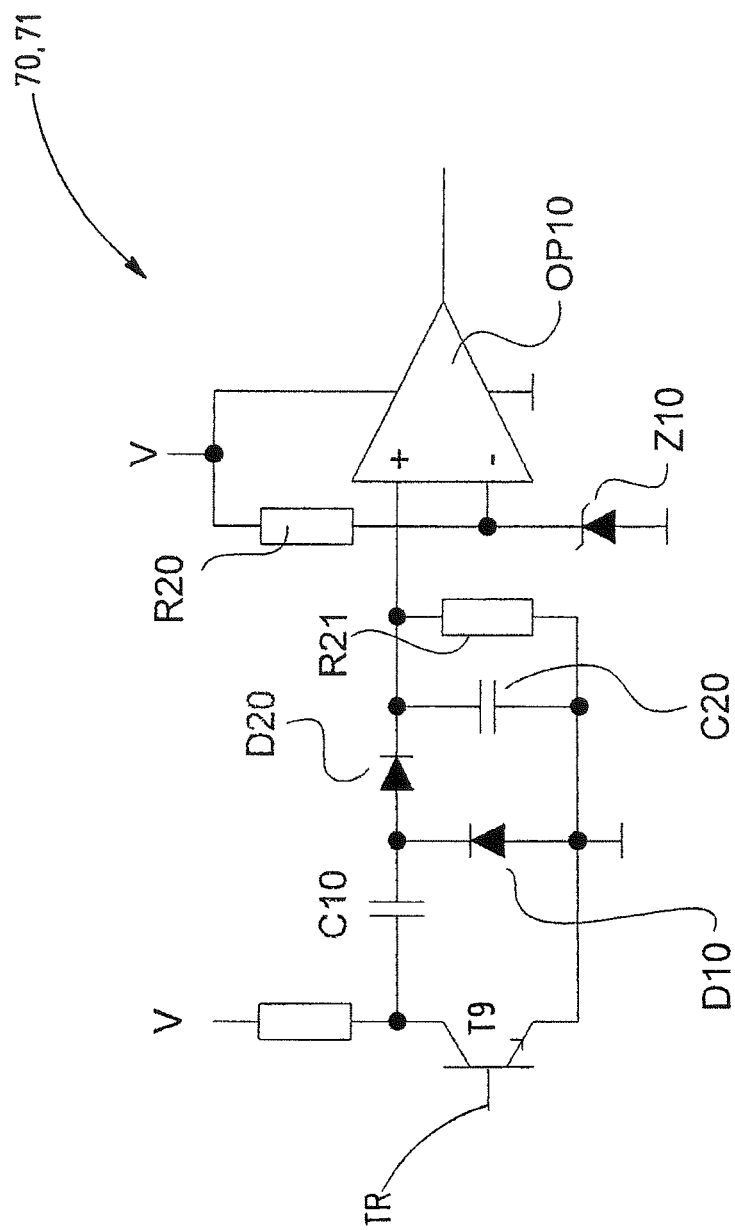
FIG. 7 shows a block diagram of an illustrative implementation of a watchdog.

Purely illustratively, FIG. 7 shows a block diagram of an illustrative implementation of a watchdog in the form of a HW watchdog. However, it should be understood that the illustrative implementation of FIG. 7 is purely illustrative and that any other suitable type of implementation can be provided. In the illustrative implementation of FIG. 7, the watchdog has an operational amplifier OP10 and preceding capacitors C10 and C20 and a transistor T9. The transistor T9 is located at the input of the watchdog and the operational amplifier OP10 is located at the output of the watchdog. A short trigger pulse TR from the control/evaluating unit 28 to the transistor T9 discharges the capacitor C10. After the triggering process has ended, the series circuit of the two capacitors C10 and C20 charges itself up to the supply voltage V. The capacitance of capacitor C10 is very much larger than the capacitance of capacitor C20. According to the law of capacitive voltage dividers, almost the entire supply voltage V is present across the very much smaller capacitor C20 after the charging process has ended. Capacitor C20 now discharges via resistor R21 and the diode D20 is cut off.

The high-impedance resistor R21 produces a slow discharge of the capacitor C20. When the capacitor C20 has been discharged to a voltage which corresponds to the threshold value determined by the Zener diode Z10, the operational amplifier OP10 changes its output state and switches to a low level (L). The watchdog thus responds and detects the fault condition. Thus, the watchdog then delivers the fault condition signal. In the case of no fault or fault-less operation, respectively, the responding of the watchdog is prevented by the transistor stage being triggered in time.

In a further illustrative embodiment (not shown) of the safety switching device 1, the failsafe control/evaluating unit 28 has an input for receiving a status signal which is generated by the fault detector 54 on detection of a fault condition of the voltage converter 52. The failsafe control/evaluating unit 28 also has a memory for storing a corresponding fault entry on reception of the status signal.

Figure 8:
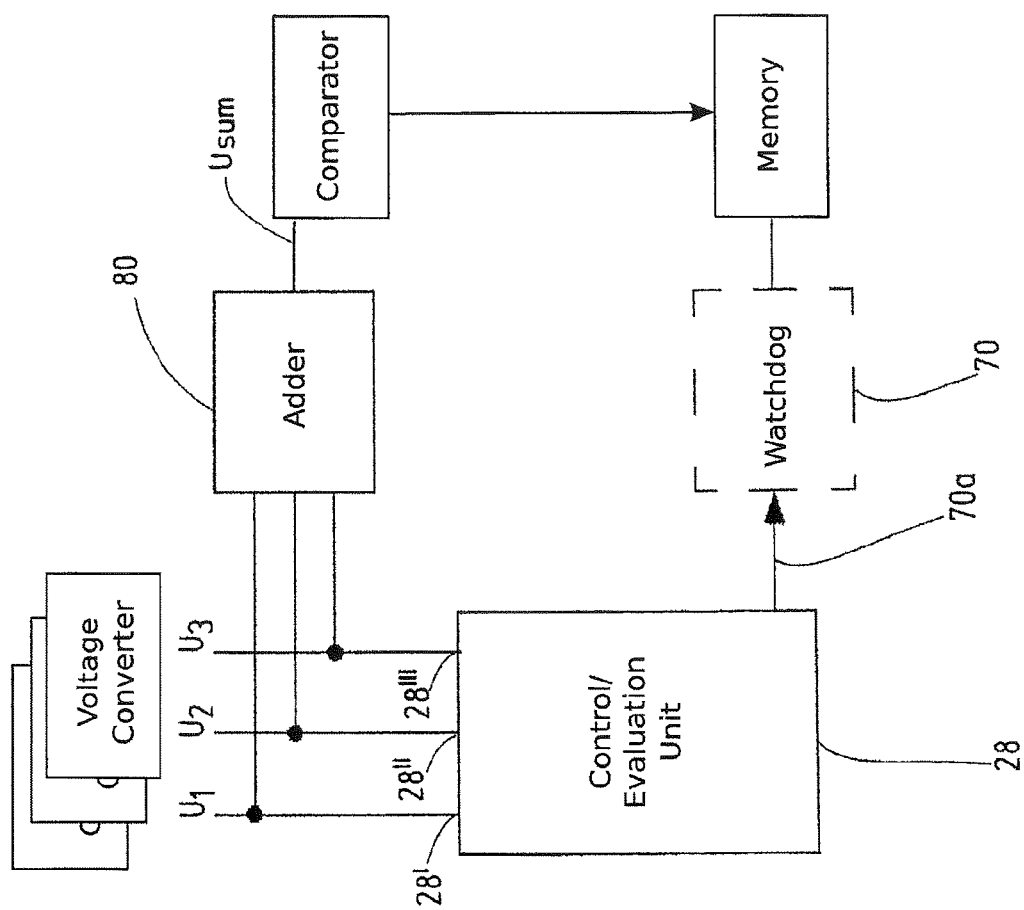
FIG. 8 shows a simplified representation of a part of an illustrative embodiment of the novel safety switching device.

The power supply 50 has been described above in such a manner that it provides an output voltage $U_e$ or operating voltage, respectively. However, the power supply 50 can also be suitable for providing a number of operating voltages. FIG. 8 shows a simplified representation of a part of an illustrative embodiment of the novel safety switching device 1. In this illustrative embodiment, the power supply 50 is constructed for generating a number of operating voltages for the failsafe control/evaluating unit 28. The power supply 50 therefore has a number of voltage converters (not shown in FIG. 8) for converting the input voltage $U_e$ into several output voltages $U_1$, $U_2$, $U_3$ in each case of a defined output voltage value. That is to say, each voltage converter converts the one input voltage $U_e$ into a particular output voltage. Each output voltage $U_1$, $U_2$, $U_3$ in each case corresponds to an operating voltage for the control/evaluating unit 28. Each output voltage $U_1$, $U_2$, $U_3$ or operating voltage, respectively, is supplied in each case to a corresponding supply voltage output 28', 28'', 28''' of the control/evaluating unit 28 via in each case a corresponding electrical connection.

Figure 9:
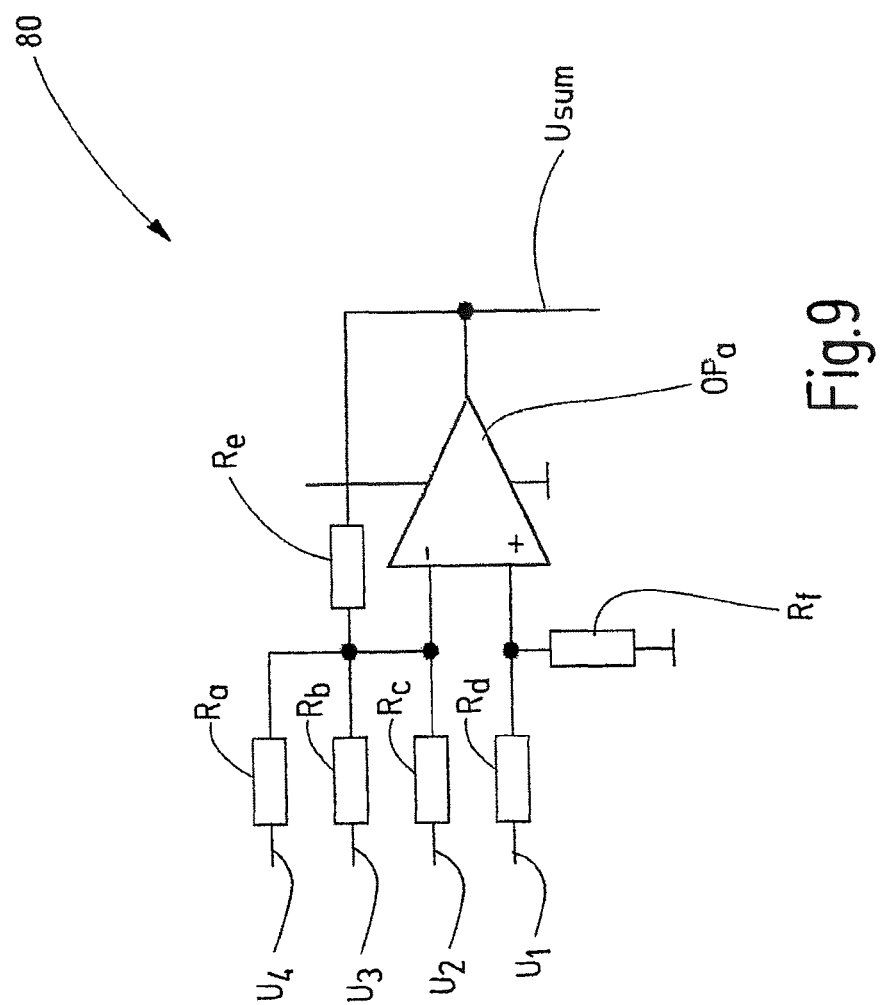
FIG. 9 shows a block diagram of an illustrative implementation of an adder.

The safety switching device 1 also has an adder 80 for providing an aggregate voltage $U_{sum}$ which corresponds to the sum of the several operating voltages $U_1$, $U_2$, $U_3$. The aggregate voltage $U_{sum}$ is here the instantaneously present output voltage $U_a$ for the comparator 56. The aggregate voltage $U_{sum}$ is thus supplied to the fault detector 54. Thus, the aggregate voltage $U_{sum}$ is monitored, especially for overvoltage or undervoltage. In the case of a number of voltage converters, only one common input voltage thus needs to be disconnectable in order to ensure safety. Purely illustratively, FIG. 9 shows a block diagram of an illustrative implementation of an adder 80. The adder 80 in FIG. 9 is an operational amplifier OPa interconnected to form an adder. Although FIG. 8 and FIG. 9, respectively, show three or four output voltages, it should be understood that any other arbitrary number of voltages can be added.

If the control/evaluating unit 28 has at least two processing units 28a, 28b, the at least two processing units 28a, 28b can have different operating voltages from the several operating voltages generated by the power supply 50. It is possible to provide several separate or different voltage supplies in the case of a multi-channel safety switching device (i.e. having a number of signal processing channels). Due to the fact that the processing units of different signal processing channels receive different operating voltages, the processing unit or signal processing channel not affected by the fault can continue to be operated. Thus, the safety of the safety switching device is increased further. As an alternative, the at least two processing units 28a, 28b can have the same operating voltage or operating voltages. This provides for simpler and less expensive implementation.

Naturally, a watchdog 70, 71 (shown dashed in FIG. 8) previously described can also be optionally used in the example of FIG. 8. The watchdog 70 is connected to the control/evaluating unit 28 via an electrical connection 70a and thus communicates with the control/evaluating unit. Upon detection of a fault condition of the control/evaluating unit 28, the watchdog 70 delivers a fault condition signal to the switch 60 (not shown in FIG. 8) in order to disconnect the input voltage $U_e$ of the voltage converter 52 as described before.

Finally, a risk consideration of the novel safety switching device shall be performed generally and by way of example. Some components in the voltage converter, for example, the components for regulating the output voltage $U_a$ (e.g. components of the switched-mode regulator) can cause overvoltages when they fail. These probabilities of component failure increase the risk of danger. The failure rates of the risk-increasing components can be added together and quantify the risk of hazards due to overvoltages. The value is to be designated by the variable Ra. To compensate for this risk, the measures for monitoring the output voltage of the power supply and the disconnection of the input voltage are integrated in the safe power supply. The failure rates of all components which are needed for the measures for controlling the overvoltage risk can also be added together and quantify the risk that the measures for controlling the overvoltage risk do not function. This value is to be designated by the variable Rb. The hazard due to overvoltages occurs with the probability Ra. It is controlled by means of measures which do not function with the probability Rb. If both probabilities Ra and Rb occur, the hazard due to overvoltages has occurred and cannot be controlled. This probability corresponds to Rc=Ra×Rb. When two small probabilities are multiplied, the result is usually a negligibly small probability. The total probability of hazardous failure of the safety device must be below an acceptable value which specifies the remaining residual risk. Values for the permissible residual risk can be found in the standards to be applied for different safety categories. For the probability of a hazardous failure due to overvoltages, a part (e.g. 1%) of the permissible total probability is applied as the limit value.

What is claimed is:

1. A safety switching device for switching on or off a hazardous installation in a failsafe manner, comprising:
an input for receiving an input signal,
a failsafe control/evaluating unit which processes the input signal in order to generate an output signal for switching on or off the hazardous installation in dependence thereon, and
a power supply for providing at least one operating voltage for the control/evaluating unit,
wherein the power supply has a voltage converter for converting an input voltage into an output voltage of a defined output voltage value, said output voltage corresponding to the operating voltage,
wherein the power supply has a fault detector for detecting a fault condition of the voltage converter,
wherein the fault detector has a comparator for comparing a currently present output voltage with a defined reference voltage,
wherein the fault detector provides a fault condition signal upon detection of a predetermined deviation of the currently present output voltage from the reference voltage, and
wherein the power supply has a switch which disconnects the input voltage of the voltage converter when the fault condition signal is present.

2. The safety switching device of claim 1, wherein the fault detector further has a memory for storing the fault condition signal, said memory having a first memory input connected to the comparator and at least one output activating the switch.

3. The safety switching device of claim 2, wherein the memory further has a second memory input which receives a reset signal when the input voltage is switched on, in order to terminate the storing of the fault condition signal.

4. The safety switching device of claim 2, wherein the memory is a bistable flipflop.

5. The safety switching device of claim 1, wherein the fault detector provides a fault condition signal upon detection of the currently present output voltage exceeding the reference voltage by a predetermined amount so that the fault condition corresponds to an overvoltage of the output voltage.

6. The safety switching device of claim 1, wherein the fault detector provides a fault condition signal upon detection of the currently present output voltage being less than the reference voltage by a predetermined amount so that the fault condition corresponds to an undervoltage of the output voltage.

7. The safety switching device of claim 1, wherein the voltage converter has a converter input, and the switch is arranged in a current path to the converter input so that the switch interrupts a current supply to the voltage converter when the fault condition signal is present.

8. The safety switching device of claim 1, wherein the voltage converter has a switched-mode regulator comprising a switching transistor for regulating a current flow through the voltage converter in order to keep the output voltage at the defined output voltage value.

9. The safety switching device of claim 8, wherein the switch for disconnecting the input voltage is the switching transistor.

10. The safety switching device according to claim 8, wherein the switched-mode regulator has a regulator input for receiving a switched-mode regulator supply voltage, and wherein the switch is arranged in a current path to the regulator input so that the switch interrupts a current supply to the regulator input when the fault condition signal is present.

11. The safety switching device of claim 1, further comprising at least one watchdog which is connected to the control/evaluating unit and which delivers a fault condition signal to the switch upon detection of a fault of the control/evaluating unit in order to disconnect the input voltage of the voltage converter.

12. The safety switching device of claim 1, wherein the power supply is designed for generating a plurality of different operating voltages for the failsafe control/evaluating unit.

13. The safety switching device of claim 12, further comprising an adder for providing an aggregate voltage which corresponds to a sum of the plurality of different operating voltages, and wherein the aggregate voltage is the currently present output voltage for the comparator.

14. The safety switching device of claim 12, wherein the control/evaluating unit has at least two processing units which perform logical combinations redundantly with respect to one another in order to generate the output signal in dependence thereon.

15. The safety switching device of claim 14, wherein the at least two processing units use different ones from the plurality of different operating voltages.

16. The safety switching device of claim 1, wherein the control/evaluating unit has a status input for receiving a status signal generated by the fault detector upon detecting a fault condition of the voltage converter, and wherein the failsafe control/evaluating unit has a memory for storing a corresponding fault entry upon receiving the status signal.

* * * * *